United States Patent [19]

Suzuki et al.

[11] Patent Number: 4,914,595
[45] Date of Patent: Apr. 3, 1990

[54] SYSTEM AND METHOD FOR AUTOMATICALLY CONTROLLING VEHICLE SPEED TO A DESIRED CRUISING SPEED

[75] Inventors: Kouichi Suzuki; Kiyoshi Konishi; Toshio Iwaoka; Yuichi Yamaguchi; Eisaku Hori; Satoru Sekiguchi, all of Kanagawa, Japan

[73] Assignee: Nissan Motor Company, Limited, Yokohama, Japan

[21] Appl. No.: 169,218

[22] Filed: Mar. 16, 1988

[30] Foreign Application Priority Data

Mar. 19, 1987 [JP] Japan .................................. 62-62365

[51] Int. Cl.⁴ ...................... B60K 31/02; G05D 13/58
[52] U.S. Cl. .............................. 364/426.04; 180/178; 364/431.07
[58] Field of Search ................... 364/431.07, 424, 426; 123/351, 352; 180/170, 178

[56] References Cited

U.S. PATENT DOCUMENTS

| | | | |
|---|---|---|---|
| 4,428,776 | 5/1982 | Kumo et al. | 123/352 |
| 4,484,279 | 11/1984 | Muto | 364/431.07 |
| 4,540,060 | 9/1985 | Kawata et al. | 364/431.07 |
| 4,549,266 | 10/1985 | Schugiden et al. | 364/431.07 |
| 4,598,370 | 7/1986 | Nakajina et al. | 364/431.07 |
| 4,636,957 | 1/1987 | Otobe et al. | 364/431.07 |
| 4,725,969 | 2/1988 | Onogi et al. | 364/426.04 |

FOREIGN PATENT DOCUMENTS 59-8023  1/1984  Japan .

Primary Examiner—Felix D. Gruber
Attorney, Agent, or Firm—Foley & Lardner, Schwartz, Jeffery, Schwaab, Mack, Blumenthal & Evans

[57] ABSTRACT

A system and method for automatically controlling a vehicle speed to a desired cruising speed are disclosed in which an abrupt deceleration time for which the vehicle is abruptly decelerated to the vehicle speed at a time when an off operation of an acceleration switch in a cruise command switch group is carried out after an on operation of the acceleration switch to carry out a constant deceleration of the vehicle is calculated from the total duration of time for which the actuator is controlled so that the vehicle speed increases at a constant rate. Therefore, no need to adjust the abrupt deceleration time according to the individual vehicles in which the systems are mounted. In addition, since the actuator is rendered in the abrupt deceleration state within the appropriate duration of time, road conditions, or a speed range in which the vehicle cruises does not affect the performance of the system. Furthermore, since when the total duration of time is above a first predetermined value and the magnitude of the acceleration is below a second predetermined value, the actuator is not actuated so that an undershooting of the vehicle speed does not occur immediately when the acceleration switch of the system is turned off after the on operation of the switch.

11 Claims, 4 Drawing Sheets

SYSTEM AND METHOD FOR AUTOMATICALLY CONTROLLING VEHICLE SPEED TO A DESIRED CRUISING SPEED

BACKGROUND OF THE INVENTION (1) Field of the Invention

The present invention relates to a system and method for automatically controlling vehicle speed to a set cruising speed.

(2) Background of the Art

Various types of systems and methods for automatically controlling vehicle speed to a set cruising speed have been proposed.

A Japanese Patent Application Unexamined Publication sho 59-8023 published on Jan. 17, 1984 exemplifies one of the proposed automatical vehicle speed controlling systems including a vehicle speed sensor outputting an operation data in proportion to the vehicle speed, a command switch group outputting cruise command signals, means for storing the operation data derived from the vehicle speed sensor in response to an operation of the command switch group, an actuator for actuating an engine throttle valve, and controlling means for providing a command to the actuator according to a difference between the actual vehicle speed and the stored vehicle speed.

In the automatical vehicle speed controlling system in the above-identified Japanese Patent Application Publication, the vehicle speed at a time when a set switch in the command switch is turned off after the set switch has been turned on is stored in a memory location, the controlling means provides the command for the actuator in accordance with a difference between the stored vehicle speed and actual vehicle speed, and the throttle valve is actuated in response to the operation of the actuator so that the actual vehicle speed is adjusted to the stored vehicle speed to achieve a cruise run of the vehicle at the stored vehicle speed. In addition, the actuator is forced in an acceleration state according to an off operation of the above-described acceleration switch and the vehicle runs at the cruising speed which is the vehicle speed at a time when the acceleration switch has been turned off.

However, the above-described previously proposed vehicle speed automatical controlling system has a drawback. That is to say, it is necessary to adjust an abrupt deceleration duration of time in which the actuator is rendered in a deceleration state immediately after the acceleration switch in the on state has, in turn, been turned off in a case when the actuator has been rendered in the constant acceleration state is response to the on operation of the acceleration switch for each vehicle in which the system is mounted since an engine performance, deceleration ratio, weight, and road condition are varied according to the vehicle in which the system is mounted. If such an adjustment is imperfect, the vehicle speed exhibits an undesired undershooting and/or overshooting. This is especially pronounced as the duration of abrupt deceleration increases. In this situation the vehicle speed exhibits increased undershooting of the desired speed and, consequently, is more difficult to drive.

SUMMARY OF THE INVENTION

It is an object of the present invention to provide a system and method for automatically controlling vehicle speed to a set cruising speed in which an optimum abrupt deceleration time can be set without influence of the individual vehicles in which the systems are mounted, road condition, and/or speed range within which the vehicle runs at the cruising speed.

It is another object of the present invention to provide the system and method for automatically controlling cruising speed to the set cruising speed in which an occurrence of overshooting and/or undershooting of the vehicle speed can be prevented which follows an elongated duration of time for which the vehicle speed is abruptly decelerated.

The above-described objects can be achieved by providing a system for automatically controlling a vehicle speed to a desired cruising speed, comprising: (a) first means for detecting a vehicle speed and outputting a signal indicative thereof; (b) second means for actuating an engine speed adjusting means of the vehicular engine in response to an actuation command; (c) third means responsive to an acceleration command for providing the actuation command for the second means to control the second means on the basis of the vehicle speed signal derived from the first means so that the vehicle runs at a constant deceleration and for calculating a total duration of time for which the second means is controlled; (d) fourth means for providing the acceleration command for the third means in response to a first operation thereof; (e) fifth means for monitoring the total duration of time calculated by the third means and for deriving a duration of time during which an abrupt deceleration is carried out in response to a second operation of the fourth means to render the vehicle cruise at the vehicle speed immediately after the second operation,, the duration of time during which the abrupt deceleration is carried out corresponding to the total duration of time calculated by the third means; and (f) sixth means for deactuating the second means for the duration of time derived by the fifth means so that the vehicle is abruptly decelerated and cruises at the vehicle speed at the time of the second operation of the fourth means.

The above-described objects can also be achieved by providing an apparatus comprising: (a) a vehicle speed sensor for outputting an operation data in proportion to an actual vehicle speed; (b) a command switch group for outputting cruise command signals; (c) vehicle speed storing means for storing the operation data of the vehicle speed sensor in response to a predetermined operation of the command switch; (d) an actuator linked with an engine throttle valve of the vehicle for actuating the throttle valve independently of a manually operated accelerator; (e) abrupt deceleration controlling means for supplying an actuation command to the actuator in correspondence to a difference between the present vehicle speed and stored vehicle speed in the vehicle speed storing means, rendering the actuator in the acceleration state in response to an on operation of an acceleration switch of the command switch, calculating an abrupt deceleration duration of time of the actuator immediately after an off operation of the acceleration switch, the abrupt deceleration duration of time corresponding to an addition time of a control duration of time during which the actuator is rendered in the acceleration state, and rendering the actuator in the abrupt deceleration state during the calculated abrupt deceleration duration of time, and (f) stopping means for deactuating the actuator when the addition value is above a first predetermined value and the acceleration is below a second predetermined value.

The above-described objects can also be achieved by providing a method for automatically controlling a vehicle speed to a desired cruising speed, comprising the steps of: (a) detecting a vehicle speed and outputting a signal indicative of the vehicle speed; (b) providing an actuator actuating an engine speed adjusting means of the vehicular engine in response to an actuation command; (c) providing an acceleration command in response to a first operation of a first switch, calculating a total duration of time for which the actuator is controlled in an acceleration state on the basis of the detected vehicle speed and providing the actuation command for the actuator during the calculated duration of time so that the vehicle runs at a constant acceleration; (d) monitoring the calculated duration of time in the step (c) and deriving a duration of time during which an abrupt deceleration is carried out in response to a reversed operation of the first switch to render the vehicle cruise at the vehicle speed immediately after the reversed operation, the duration of time during which the abrupt deceleration is carried out corresponding to the total duration of time calculated in the step (c); and (e) deactuating the actuator for the duration of time derived in the step (d) so that the vehicle is abruptly decelerated and cruises at the vehicle speed at the time of the reversed operation of the first switch.

DETAILED DESCRIPTION OF THE PREFERRED EMBODIMENT

Figure 1:
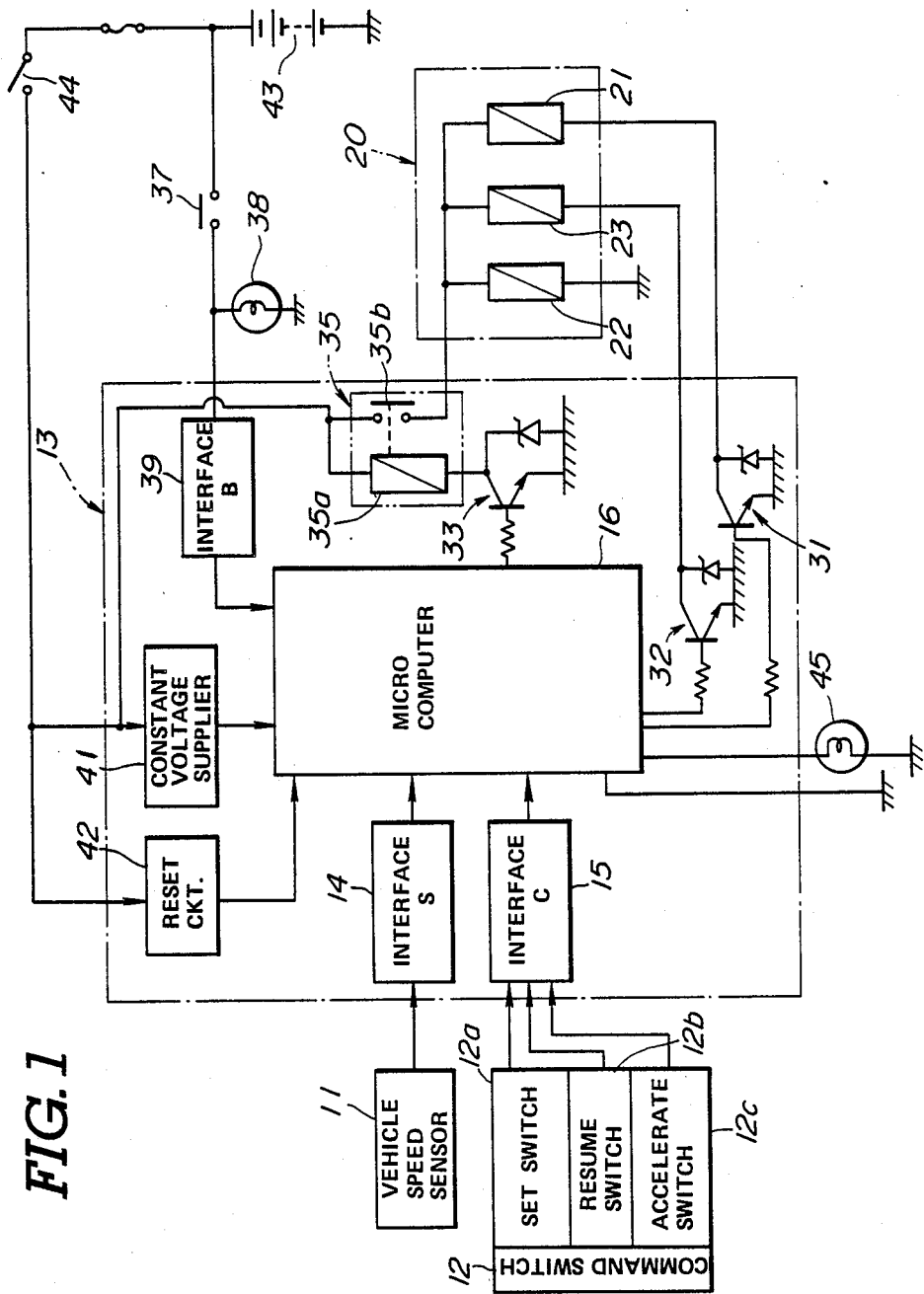
FIG. 1 is a circuit block diagram of a system for automatically controlling the vehicle speed to a set cruising speed according to the present invention.

Reference will hereinafter be made in the drawings in order to facilitate understanding of the present invention.

FIG. 1 shows a preferred embodiment of a system for automatically controlling a vehicle speed to a desired cruising speed.

In FIG. 1, a vehicle speed sensor 11 is installed for detecting a vehicle speed, i.e., producing and outputting a signal of pulses whose number is in proportion to the actual vehicle speed. A command switch 12 is installed for outputting a series of commmand signals. The command switch 12 includes a set switch 12a, resume switch 12b, and acceleration switch 12c. The output signals from the vehicle speed sensor 11 and command switch 12 are supplied to a microcomputer 16 installed in a control circuit 13 via interfaces 14 and 15, respectively.

It is noted that the microcomputer 16 functionally includes: vehicle speed storage means for storing the operation data (in a pulse form) outputted from the vehicle speed sensor 11 in response to an operation of the set switch 12a in the command switch 12 as the actual vehicle speed; abrupt deceleration controlling means for outputting a command to a throttle actuator 20 to be described later, rendering the actuator 20 in the acceleration state in response to an ON operation of the actuator 20, calculating an abrupt deceleration time $T_{ACC}.OFF$ according to an addition value of a control duration of time in which the actuator 20 is rendered in the acceleration state immediately after the acceleration switch 12c has been turned off, and rendering the throttle actuator 20 in the abrupt deceleration state during an abrupt deceleration duration of time $T_{ACC}.OFF$ which is calculated; and stopping means for halting the addition for the addition value with the actuator being in an inoperative state when the addition value is above a predetermined value and a magnitude of the acceleration is below the predetermined value.

Figure 2:
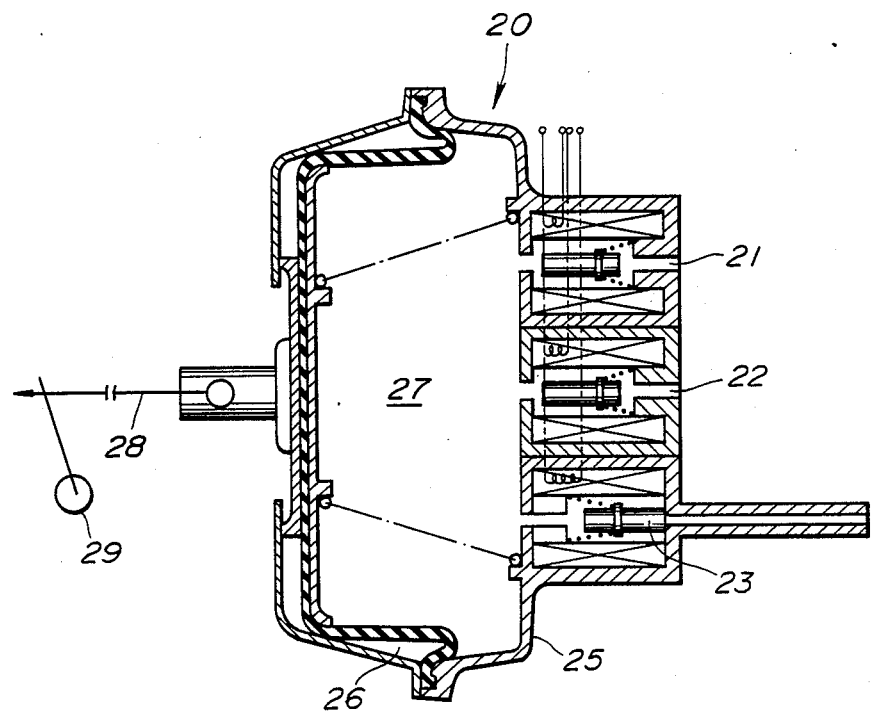
FIG. 2 is a cross sectional view of an actuator in the vehicle speed automatically controlling system shown in FIG. 1.

The throttle actuator 20, as shown in FIG. 2, includes a vent valve 21, safety valve 22, and vacuum valve 23. Each end of the vent valve 21 and safety valve 22 is exposed to the atmosphere. One end of the vacuum valve 23 is connected to the intake manifold (negative pressure source) of the engine. The other end of each valve 21, 22, and 23 is communicated with a negative pressure source 27 formed with a casing 25 and one side surface (left side surface as viewed from FIG. 2). The other side surface of the diaphragm is connected with one end of a control wire 28. The other end of the control wire is linked with an axle 29 of the throttle valve.

Furthermore, a vent valve switching section 31 is installed in the control circuit 13 for carrying out an on-off control for the vent valve 21 according to the output signal from the microcomputer 16. A vacuum valve switching section 32 is installed in the control circuit 13 for carrying out the on-off control for the vacuum valve 23 according to the output signal of the microcomputer 16. An actuator switching section 33 is installed in the control circuit 13 for carrying out the on-off control for a power supply to the actuator according to the output signal from the microcomputer 16. The on and off control for the power supply to the actuator is carried out via a relay 35 having a relay coil 35a and relay switch 35b.

In addition, an output signal from a brake switch 37 indicating that the vehicle brake is carried out is supplied to the microcomputer 16 via an interface 39 in the control circuit 13 and brake lamp 38. The output signal from the brake switch 37 is used for inhibiting the system operation.

It is noted that numeral 41 denotes a constant voltage supply circuit, 42 denotes a reset circuit, 43 denotes a power supply such as a vehicle battery, 44 denotes a main switch for the whole system, and 45 denotes a cruise lamp.

The structure of the actuator 20 and control circuit are also exemplified in U.S. patent applications Ser. No. 057,086 filed on June 3, 1987, Ser. No. 061,295 filed on June 12, 1987, and Ser. No. 109,031 filed on Oct. 16, 1987, the disclosures of which are hereby incorporated by reference.

Next, the automatic operation of the vehicle speed controlling system in the preferred embodiment will be described below with reference to FIGS. 3(A) and 3(B).

Figure 3A:
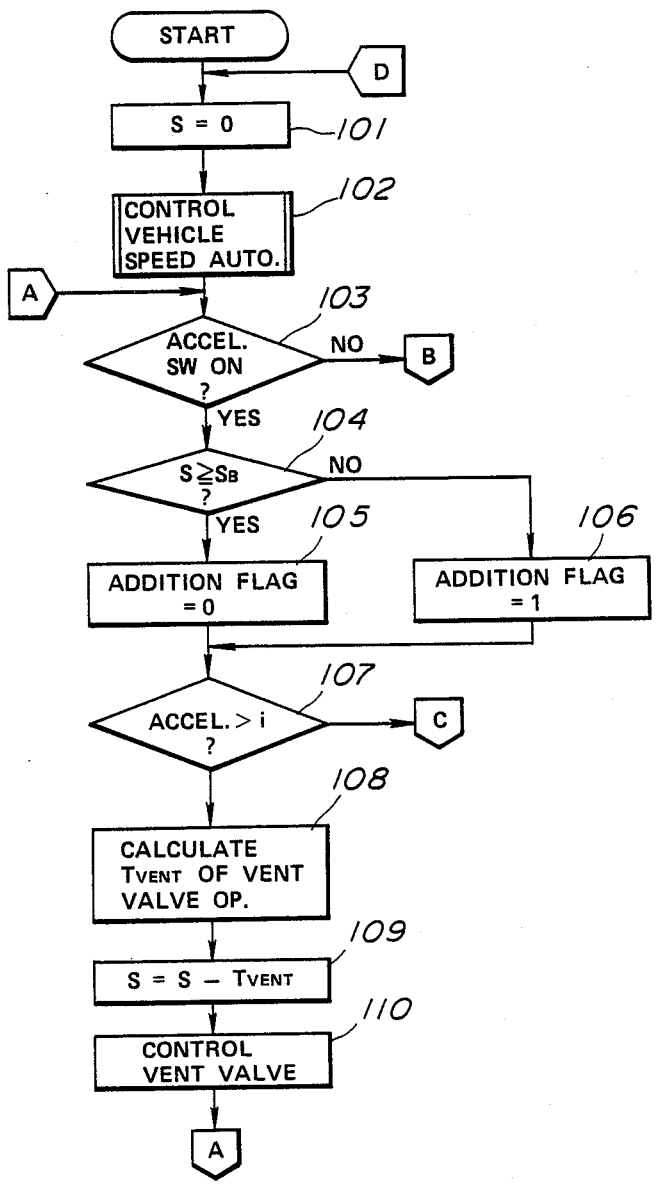
FIGS. 3(A) and 3(B) taken together represent a flow chart executed in the vehicle speed automatically controlling system shown in FIG. 1.
Figure 3:
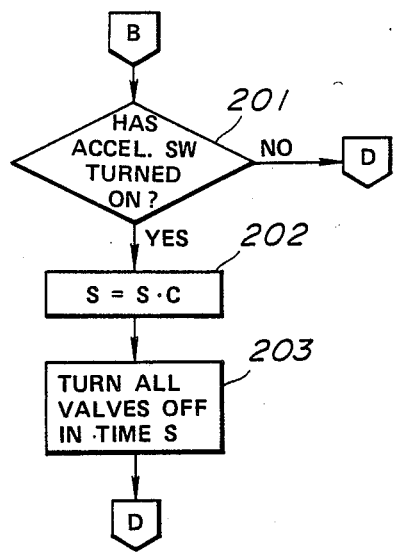
Figure 3:
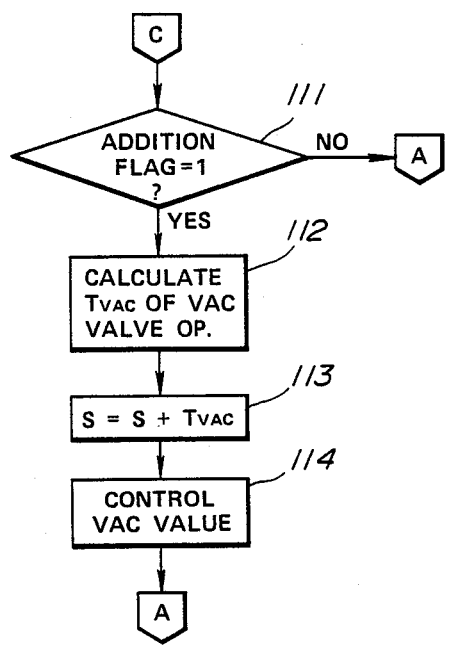

FIGS. 3(A) and 3(B) taken together represent a flowchart indicating a control program executed by the microcomputer 13 shown in FIG. 1.

The program shown in FIGS. 3(A) and 3(B) is executed once for each predetermined time.

First, in a step 101, a time S (abrupt deceleration time $T_{ACC}.OFF$) is reset to zero. Then, the routine goes to a step 102, in which the microcomputer 13 executes a vehicle speed automatic control through the actuator 20. That is to say, in the step 102, the microcomputer executes the vehicle speed control in response to an OFF operation of the set switch 12a so that the vehicle speed coincides with the vehicle speed at a time when the set switch 12a is in the OFF position after the set switch 12a is turned to ON state. At this time, the time S is reset to zero since no deceleration of the vehicle is carried out in the state when the automatic vehicle speed control is initiated.

In the next step 103, the microcomputer 13 determines whether the acceleration switch 12c is turned on or off. If the acceleration switch 12c is turned on (Yes), a constant acceleration control is initiated in response to the on operation of the acceleration switch 12c. That is to say, to improve the acceleration performance and acceleration feeling, an opening angle θ of the throttle valve axle 29 is to increase the vehicle speed.

In the next step 104, the microcomputer 13 determines whether an addition value (time) S exceeds a predetermined value $S_B$. If the addition value S is above the predetermined value $S_B$, an addition flag is reset in a step 105. If the addition value S is below the predetermined value $S_B$, the routine goes to a step 106 in which the addition flag is set and goes to a step 107.

In the step 107, the microcomputer 13 determines a magnitude of the acceleration at a time when the control is transferred to the constant acceleration in the step 103. That is to say, the microcomputer 13 determines whether the present acceleration is larger than a set acceleration i.

It is noted that if the present acceleration is larger than the set acceleration i (Yes) in the step 107, the microcomputer 13 determines that the vehicle is in an abrupt acceleration state as compared with a predetermined acceleration state through the constant acceleration control and the routine goes to a step 108.

In the step 108, the microcomputer 13 calculates a vent valve operation duration of time $T_{VENT}$ of the vent valve 21 at that time. It is also noted that the preset acceleration is derived from a subtraction of one previous vehicle speed from the present vehicle speed.

In the next step 109, the microcomputer 13 calculates a new addition value S from the subtraction of the vent valve operation time (the duration of time during which the vent valve 21 is closed) $T_{VENT}$ from the time S.

Then, in a step 110, the control for the vent valve 21 is carried out on the basis of the above-described vent valve operation time $T_{VENT}$. Next, the routine returns to the step 103.

If the present acceleration is below the set acceleration i (No) in the step 107, the microcomputer 13 determines that the vehicle is in a slow acceleration state as compared with the predetermined acceleration state through the constant acceleration control of the automatic cruising speed controlling system and the routine goes to a step 111. If the addition flag is set, the routine goes to a step 112 in which the vacuum valve operation duration of time $T_{VAC}$ (that is to say, a duration of time during which the vacuum valve 23 is opened) is calculated.

In the next step 113, the microcomputer 13 calculates a new addition value S by adding the vacuum valve operation duration of time $T_{VAC}$ calculated in the step 112 to the time S. In the next step 114, the control of the vacuum valve 23 is carried out on the basis of the vacuum valve operation duration of time $T_{VAC}$. Then the routine returns to the step 103.

When the addition flag is reset in the step 111, i.e., the addition value S is above the predetermined value $S_B$ and the acceleration is below the set acceleration i, the vacuum valve operation duration of time $T_{VAC}$ is not calculated and the addition to the addition value S is not carried out. In addition, the control of the vacuum valve 23 is stopped.

Hence, an undershooting state immediately after the off operation of the acceleration switch 12c can be eliminated.

If the microcomputer 13 determines No in the steps 110, 114, and 111, the routine returns to the step 103. Any one of the routines of the steps 103, 104, 105, 107, 108, 109, and 110, or steps 103, 014, 106, 107, 108, 109, and 110, or steps 103, 014, 015, 107, 111, or steps 103, 104, 106, 107, 111, 112, and 113 is in a loop state. At this routine, the time S is adjusted by means of the operation duration $T_{VAC}$ or $T_{VENT}$ of the vacuum valve 23 or vent valve 21.

If, in the step 103, the microcomputer 13 determines that the acceleration switch 12c is not in the on state (No), the routine goes to the step 201 in which the microcomputer 13 determines that the acceleration switch 12c has turned off after the on operation of the acceleration switch 12c. That is to say, the microcomputer 13 determines whether the constant acceleration control is carried out or not. If the acceleration switch 12c is not turned off (No), the microcomputer 13 determines that the constant acceleration control is not carried out.

That is to say, the microcomputer 13 determines that the vehicle runs in the cruising speed control state and the routine returns to the step 101. Until the acceleration switch 12c is turned on and the control is transferred to the constant acceleration control, the program is in the loop state between the steps 101, 102, 103, and 201.

If, in the step 201, the microcomputer 13 determines that the acceleration switch 12c has been turned off after the turn on thereof (Yes), the microcomputer 13 determines that the constant acceleration is ended in response to the off operation of the acceleration switch 12c. In the step 202, the microcomputer 13 calculates the time S (that is to say, the abrupt deceleration time $T_{ACC}$.OFF) from the equation:

$$S = S(\text{time}) \times C(\text{constant}).$$

That is to say, the operation duration of time $T_{VAC}$ of the vacuum valve 23 and operation duration of time $T_{VENT}$ of the vent valve 21 are essential elements for the abrupt deceleration duration time in the constant acceleration state.

In other words, the abrupt deceleration time $T_{ACC}$.OFF can be determined from an equation (1):

$$T_{ACC} \cdot \text{OFF} = \int_0^{tn} T_{VAC} - \int_0^{tn} T_{VENT \cdot C} \qquad (1)$$

Therefore, no adjustment is needed for the abrupt deceleration duration of time even if the engine performance, deceleration ratio, or weight, or so on is different according to the vehicle in which the system is mounted.

In addition, in the step 203, the microcomputer 13 turns all valves 21, 22, and 23 off as shown in FIG. 2. at the time S calculated in the step 202 and the actuator 20 is in the abrupt deceleration state.

In details, the opening angle θ of the throttle valve axle 29 is once returned to the throttle opening angle $\theta_1$ corresponding to the vehicle speed $V_1$ and thereafter the opening angle is adjusted to $\theta_2$ corresponding to the vehicle speed (vehicle speed at the time of off operation of the acceleration switch 12c, i.e., the stored vehicle speed).

Then the routine returns to the step 101, in which the microcomputer carries out the cruising speed control at the opening angle $\theta_2$ of the throttle valve axle 29 adjusted in the step 203.

Hence, the constant acceleration control is carried out in response to the on operation of the acceleration switch 12c. Then, the abrupt deceleration duration of time $T_{VAC}$.OFF is calculated using the above-described equation (1) from the operation duration of time $T_{VAC}$ of the vacuum valve 23 and operation duration of time $T_{VENT}$ of the vent valve 21 of the vacuum valve 23 until the acceleration switch 12c has been turned off. Therefore, it is not necessary to adjust the abrupt duration of time $T_{ACC}$.OFF for each vehicle. Then, all valves 21, 22, and 23 are turned off at the abrupt deceleration time $T_{ACC}$.OFF so that the overshooting and undershooting can be prevented.

It is noted that in the preferred embodiment, a negative pressure responsive actuator 20 is used, but a positive pressure responsive actuator may alternatively be used. In addition, a motor-powered actuator may alternatively be used which responds to the command issued from the microcomputer 13. The positive pressure responsive actuator includes an air valve, an air supply valve, and release valve.

As described hereinabove, in the system and method for automatically controlling vehicle speed to the desired cruising speed according to the present invention, the abrupt deceleration duration of time can be suited to the various conditions without being affected by the vehicles in which the systems are mounted, road conditions, and/or speed ranges within which the vehicle cruises. Therefore, it becomes unnecessary to adjust the abrupt deceleration duration of time for each vehicle in which the system is mounted. In addition, overshooting and/or undershooting of the vehicle speed can be prevented. Especially, the undershooting state immediately after the acceleration switch has been turned off.

It will be appreciated by those skilled in the art that the foregoing description is made in terms of the preferred embodiment and various changes and modifications may be made without departing from the scope of the present invention which is to be defined by the appended claims.

What is claimed is:

1. A system for automatically controlling a vehicle speed to a desired cruise speed, comprising:
    (a) first means for detecting a vehicle speed and outputting a speed signal indicative thereof;
    (b) second means for actuating an engine speed adjusting mechanism to adjust the vehicle speed in response to an actuation command;
    (c) third means for outputting a first command to accelerate the vehicle and for outputting a second command to cruise the vehicle at a speed when the third means outputs the second command;
    (d) fourth means for outputting the actuation command to the second means so that the vehicle is accelerated at a constant rate of increase in the vehicle speed in response to the first command from the third means, the fourth means deriving a total duration of time during which the second means is actuated to accelerate the vehicle in response to the actuation command; and
    (e) fifth means, responsive to the second command from the third means, for deriving a duration of time during which the second means is deactuated so that the vehicle is abruptly decelerated on the basis of the total duration of time derived by the fourth means and for deactuating the second means to abruptly decelerate the vehicle for the derived duration of time so that the vehicle is abruptly decelerated and cruises at the vehicle speed at the time when the second command is outputted from the third means without undershooting of the vehicle speed.

2. A system as set forth in claim 1, which further comprises: sixth means for determining whether the total duration of time calculated by the fourth means for which the second means is controlled exceeds a first predetermined value; seventh means for determining whether a present acceleration derived on the basis of the vehicle speed detected by the first means is below a second predetermined value; and eighth means for inhibiting the calculation of the total duration of time by the third means.

3. A system as set forth in claim 2, wherein the fourth means comprises a first switch in a command switch group, the first operation being an on operation of the first switch and the second operation being an off operation of the first switch after the on operation of the first switch.

4. A system as set forth in claim 2, wherein the engine speed adjusting mechanism comprises an engine throttle valve installed in an intake manifold of the vehicular engine and the second means comprises an actuator having a first valve which actuates the engine throttle valve so that the vehicle speed increases when said first valve is open in response to the actuation command and a second valve which actuates the throttle valve so that the vehicle speed remains unchanged when said second valve is closed in response to the actuation command and the vehicle speed decreases when said second valve is open.

5. A system as set forth in claim 4, wherein the third means comprises ninth means for calculating a first duration of time during which the first valve is open and adding the first duration of time to the total duration of time when the sixth means determines that the total duration of time is equal to or more than the first predetermined value and the seventh means determines that the present acceleration is below the second predetermined value and tenth means for calculating a second duration of time during which the second valve is closed and subtracting the second duration from the total duration of time when the sixth means determines that the total duration of time is below the first predetermined time and the seventh means determines that the present acceleration is below the second predetermined value.

6. A system as set forth in claim 5, wherein the time during which the abrupt duration of deceleration is carried out is equal to the total duration of time calculated by the third means which is multiplied by a constant.

7. A system as set forth in claim 5, wherein the sixth means closes the first and second valves for the duration of time derived by the fifth means.

8. A system as set forth in claim 4, wherein the first valve comprises a vacuum valve which is communicated with a vacuum source when it is opened and the second valve comprises a vent valve which is communicated with the atmosphere when it is opened.

9. An apparatus comprising:
(a) a vehicle speed sensor for outputting an operation data in proportion to an actual vehicle speed;
(b) a command switch group for outputting cruise command signals;
(c) vehicle speed storing means for storing the operation data of the vehicle speed sensor in response to signals the command switch group;
(d) an actuator linked with an engine throttle valve of the vehicle for actuating the throttle valve independently of an manually operated accelerator;
(e) abrupt deceleration controlling means for supplying an actuation command to the actuator in correspondence to a difference between the present vehicle speed and stored vehicle speed in the vehicle speed storing means, rendering the actuator in an acceleration state in response to an on operation of an acceleration switch of the command switch, calculating an abrupt deceleration duration of time of the actuator immediately after an off operation of the acceleration switch, the abrupt deceleration duration of time corresponding to an addition value of a control duration of time during which the actuator is rendered in the acceleration state, and rendering the actuator in the calculated abrupt deceleration state during the abrupt deceleration duration of time; and
(f) stopping means for deactuating the actuator when the addition value is above a first predetermined value and the acceleration is below a second predetermined value.

10. A method for automatically controlling a vehicle speed to a desired cruising speed, comprising the steps of:

(a) detecting a vehicle speed and outputting a speed signal indicative thereof;
(b) actuating, with an actuator, an engine speed adjusting means of the vehicular engine in response to an actuation command;
(c) outputting a first command to accelerate the vehicle and outputting a second command to cruise the vehicle at a speed when the second command is outputted;
(d) outputting the actuation command to the actuator so that the vehicle is accelerated at a constant rate of increase in the vehicle speed in response to said first command, determining whether the degree of acceleration of the vehicle is below the constant rate of increase in the vehicle speed and deriving a total duration of time during which the actuator is actuated to accelerate the vehicle in response to the actuation command when the degree of acceleration is below the constant rate of increase in the vehicle speed; and
(e) deriving a duration of time during which the actuator is deactuated so that the vehicle is abruptly decelerated on the basis of the total duration of time derived in step (d) and deactuating the actuator to abruptly decelerate the vehicle for the duration of time so that the vehicle is abruptly decelerated and cruises at the vehicle speed at the time when said second command is outputted without undershooting the vehicle speed.

11. A method as set forth in claim 10, which further comprises the steps of (f) determining whether the total duration of time derived in the step (d) exceeds a first predetermined value, (g) determining whether a present acceleration derived in step (d) on the basis of the vehicle speed detected in the step (a) is below a second predetermined value, and (h) inhibiting the determination of the total duration of time and the operation of the actuator when the total duration of time exceeds the first predetermined value and the present acceleration is below the second predetermined value.

* * * * *